United States Patent
Xiong

(10) Patent No.: US 11,721,448 B1
(45) Date of Patent: Aug. 8, 2023

(54) RADIOACTIVE WASTE REPOSITORY WHEN CONTACTED BY WATER PROVIDES BORATES THAT ABSORB NEUTRONS

(71) Applicant: National Technology & Engineering Solutions of Sandia, LLC, Albuquerque, NM (US)

(72) Inventor: Yongliang Xiong, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 207 days.

(21) Appl. No.: 16/924,711

(22) Filed: Jul. 9, 2020

(51) Int. Cl.
G21F 9/24 (2006.01)
G21F 9/36 (2006.01)
G21F 9/22 (2006.01)
G21C 19/40 (2006.01)

(52) U.S. Cl.
CPC .............. *G21F 9/24* (2013.01); *G21F 9/22* (2013.01); *G21F 9/36* (2013.01); *G21C 19/40* (2013.01)

(58) Field of Classification Search
CPC ..... G21F 9/24; G21F 9/22; G21F 9/36; G21C 19/40
USPC .......................... 376/272; 588/16; 250/505.1
See application file for complete search history.

(56) References Cited

U.S. PATENT DOCUMENTS

| | | | |
|---|---|---|---|
| 2005/0157833 A1* | 7/2005 | Ishihara | G21F 5/00 |
| | | | 376/272 |
| 2013/0315804 A1 | 11/2013 | Halverson et al. | |
| 2013/0317274 A1 | 11/2013 | Fan et al. | |
| 2017/0101698 A1 | 4/2017 | Karamalidis et al. | |

FOREIGN PATENT DOCUMENTS

| | | | | |
|---|---|---|---|---|
| DE | 10329170 A1 * | 1/2005 | | G21F 9/36 |
| KR | 940003802 B1 * | 5/1994 | | G21F 9/36 |

OTHER PUBLICATIONS

Utton, "Dissolution of vitrified wastes in a high-pH calcium-rich solution", Journal of Nuclear Materials 435, No. 1-3 (2013): 112-122. (Year: 2013).*
Gergoric, Ravaux, Steenari, Espegren and Retegan "Leaching and Recovery of Rare-Earth Elements from Neodymium Magnet Waste Using Organic Acids" Metals 2018, vol. 8 p. 721.
Kashiwakura, Kumagai, Kubo, Wagatsuma "Dissolution of Rare Earth Elements from Coal Fly Ash Particles in a Dilute H2SO4 Solvent" Open Journal of Physical Chemistry, 2013, 3, 69-75, May 2013.

(Continued)

*Primary Examiner* — Jack W Keith
*Assistant Examiner* — Daniel Wasil
(74) *Attorney, Agent, or Firm* — Daniel J. Jenkins; Spillman Thomas & Battle PPLC

(57) ABSTRACT

A container holds radioactive material. A sub-criticality controller protects the radioactive material from reaching a criticality from contact with the water. The sub-criticality controller includes a metallic composition having at least one metal component and at least one borate component bonded to the at least one metal component. The metallic composition forms borates when the metallic composition contacts the water.

10 Claims, 20 Drawing Sheets

(56) References Cited

OTHER PUBLICATIONS

Rozelle, P.L., Khadilkar, A.B., Pulati, N. et al. "A Study on Removal of Rare Earth Elements from U.S. Coal Byproducts by Ion Exchange" Metallurgical and Materials Transactions E 3, 6-17 (2016). https://doi.org/10.1007/s40553-015-0064-7.

M Ross and J S Story "Slow neutron absorption cross sections of the elements" 1949 Rep. Prog. Phys. 12, pp. 291-304.

R. Q. Honaker, W. Zhang, and J. Werner "Acid Leaching of Rare Earth Elements from Coal and Coal Ash: Implications for Using Fluidized Bed Combustion To Assist in the Recovery of Critical Materials" Energy Fuels 2019, 33, 7, 5971-5980 May 30, 2019.

Luo, Tian, Hower, and Fan "Leaching Rare Earth Elements (REEs) from Coal Ash By Mineral Acids" Abstract AIChE Annual Meeting 2017, Nov. 2, 3 pages.

* cited by examiner

RADIOACTIVE WASTE REPOSITORY WHEN CONTACTED BY WATER PROVIDES BORATES THAT ABSORB NEUTRONS

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The present invention is directed, generally, to sub-criticality controllers and, more particularly, to sub-criticality controllers for radioactive materials, such as nuclear waste materials that are disposed of in geological repositories and that are stored in long-term storage facilities.

Radioactivity is a natural phenomenon and natural and anthropogenic sources of radiation are features of the environment. Radiation and radioactive substances have many beneficial applications in various fields, such as power generation, medicine, industry and agriculture. Unfortunately, most radioactive materials that are used in such applications can produce radioactive waste that can pose risks to workers and to the public.

Many beneficial uses of radioactive materials involve fission reactions. Fission reactions can release energy and produce gamma radiation and/or neutrons. Exemplary fissile radionuclides can include $^{233}U$, $^{235}U$, $^{239}Pu$, and $^{241}Pu$. Such radionuclides can support a self-sustaining nuclear chain reaction with neutrons of all energies, but predominantly with slow neutrons.

These fission products can induce additional fission reactions, which can result in a chain reaction. When such reactions are undesired, the reactions can be referred to as divergent chain reactions. The prevention of an inadvertent, self-sustaining nuclear chain reaction, i.e., the control of radionuclides below criticality, is crucial to the safety for long-term storage of nuclear waste, and to the safety for geological repositories for permanent disposal of nuclear waste.

Divergent chain reactions can occur accidentally at nuclear facilities, during the transport of fissile materials, or in the storage of such fissile materials. Such reactions can lead to the release of radiation, poison gas, or other undesirable products into the environment, or other undesirable events. As a result, it is critical to avoid such divergent chain reactions. Consequently, the prevention of criticality risks is commonly referred to as "nuclear criticality safety".

Nuclear criticality risks must be considered at every stage of the fuel cycle involving plutonium, uranium, and/or certain minor actinides (like for instance curium, americium, etc.). This includes uranium enrichment and conversion plants, plants for plutonium- and/or uranium-based fuels manufacture, spent fuel reprocessing plants, research laboratories involving fissile materials, effluent-treatment and waste-packaging facilities and storage and transport of fissile materials (fuels, radioactive wastes, etc.)

In most operations with fissionable materials the risk of inadvertent criticality is very low; however, this risk cannot be eliminated. Where a criticality accident leads to an excessive radiation dose, it is important to provide a means of alerting personnel, a procedure for their prompt evacuation, or other protective actions to limit their exposure to radiation. These means typically include alarm systems and moderating materials.

What is needed is an improved system and/or method that can reduce or eliminate nuclear criticality. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a repository for storing radioactive material adjacent to water. A container holds the radioactive material. A sub-criticality controller protects the radioactive material from reaching a criticality from contact with the water. The sub-criticality controller includes a metallic composition having at least one metal component and at least one borate component bonded to the at least one metal component. The metallic composition forms borates from the borate component when the metallic composition contacts the water.

Another embodiment relates to a method for protecting radioactive material from reaching a criticality from contact with water. The radioactive material is held in a container with a sub-criticality controller having a metallic composition with at least one metal component and at least one borate component bonded to the at least one metal component. The metallic composition is contacted with the water to form borates from the at least one borate component.

Yet another embodiment relates to a sub-criticality controller for protecting radioactive material within a repository from water penetrating the repository. A metallic composition has a metallic component with at least one metal therein and a borate component bonded to the metal. The water dissolves the bond between the metal and the borate component to form borates.

Alternate exemplary embodiments relate to other features and combinations of features as can be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting. Unless otherwise indicated percentages are expressed by weight.

Exemplary embodiments of the invention relate to systems and methods for nuclear waste management and, in particular, to sub-criticality controllers that prevent criticalities that can occur during the storage of radioactive materials. The controllers can be adapted for long-term storage of nuclear waste or for the disposal of radioactive materials in geological repositories.

The subject sub-critically controllers utilize materials that have a large cross-section for neutron capture, namely borate-containing materials. The borate-containing materials form compounds with various metals. These compounds have a low solubility in water, so that the compounds form borates when the compounds contact water that invades nuclear waste repositories or other containment systems that hold radioactive materials, or so that the compounds will not be readily dissolved nor moved away from the radioactive materials because of their low solubility, and therefore the compounds are always collocated with the radioactive materials.

Figure 1:
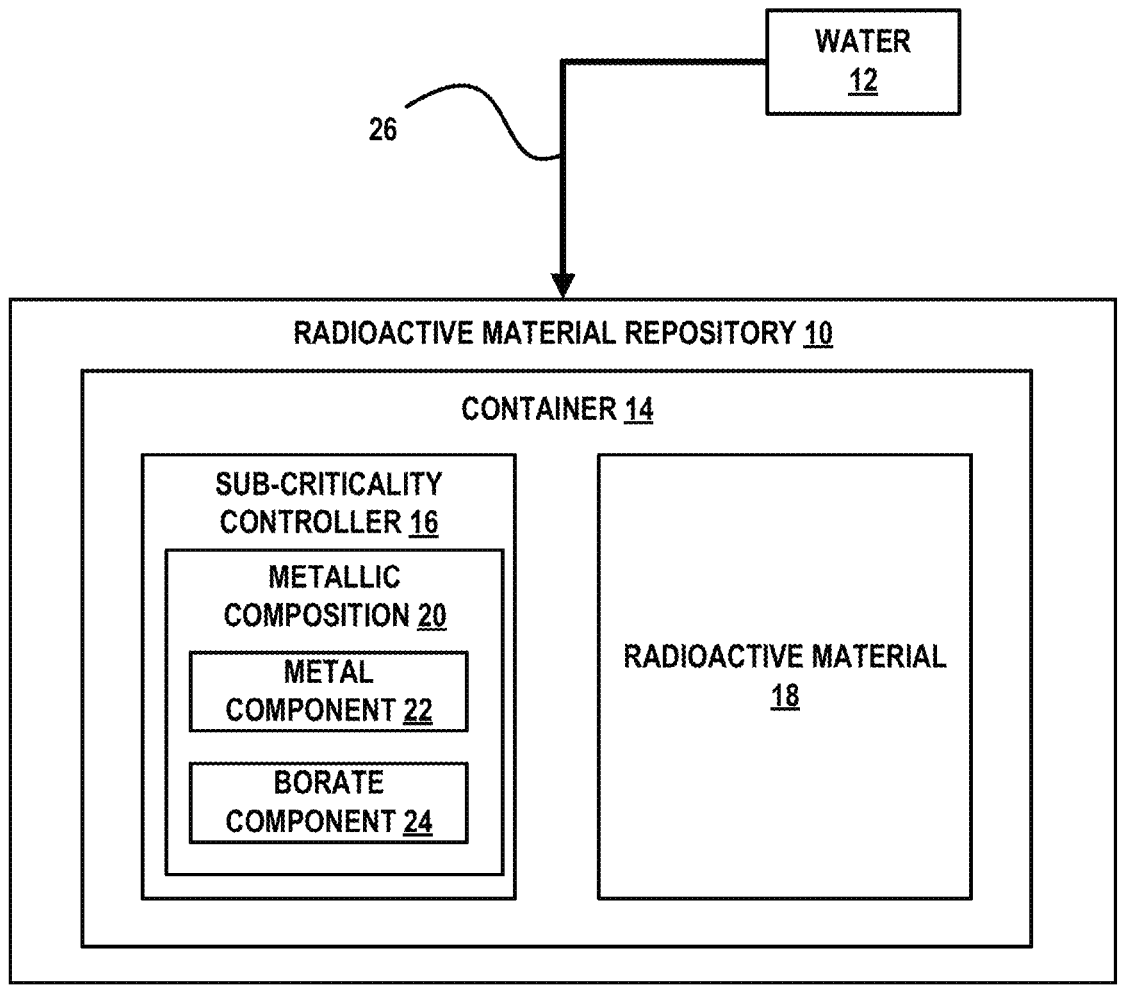
FIG. 1 schematically depicts a system for storing radioactive materials in a repository.

Turning to FIG. 1, a radioactive material repository, generally designated by the numeral 10, is shown. The repository 10 is adjacent to a water source 12. The water source 12 can be a fresh water source or a saltwater source. The water source 12 can contain groundwater and/or brines.

The repository 10 can include a container 14 therein. The container 14 includes a sub-criticality controller 16 and radioactive material 18 therein. The sub-criticality controller 16 protects the radioactive material 18 from reaching a criticality from contact with water from the water source 12.

The container 14 holds the radioactive material 18 with the sub-criticality controller 16 being adjacent thereto. The sub-criticality controller 16 protects the radioactive material 18 from water flowing from the water source 12 to invade the container 14 when the container 14 is breached.

The sub-criticality container 16 can be positioned in various configurations in relation to the container 14. In some embodiments, the sub-criticality controller 16 is positioned within the container 14 to protect the radioactive material 18 from the water after the container 14 is breached. In other embodiments, the sub-criticality controller 16 is positioned outside of the container 14 or incorporated into the container 14 to prevent the water from contacting the radioactive material 18 before the container 14 is breached.

The sub-criticality controller 16 includes a metallic composition 20 that has a metal component 22 and a borate component 24. The metal component 22 is bonded to the borate component 24. In some embodiments, the bond between the metal component 22 and the borate component 24 is an ionic bond or primarily an ionic bond. In such embodiments, the bond has an ionic character that is greater than the covalent character. Such bonds have a large difference in electronegativity between the atoms that bond the metal component 22 to the borate component 24.

The sub-criticality controller 16 can be positioned within the container 14. In other embodiments, the sub-criticality controller 16 can be positioned outside of the container 14 or incorporated into the walls of the container 14. The positioning of the sub-criticality controller 16 is not critical, as long as the sub-criticality controller 16 is positioned within a path 26 of water flowing from the water source 12. Additionally, the sub-criticality controller 16 must be positioned to absorb neutrons that radiate from the radioactive material 18.

The metallic composition 20 has a low solubility in water. As a result, the metallic composition 20 forms borates from the borate component 24 when the metallic composition 20 contacts water from the water source 12. The borates remain in place to absorb radiation from the radioactive material 18.

The borates that are formed from the borate component 24 include boron, which has a large cross-section for neutron capture. Neutron capture involves a nuclear reaction in which an atomic nucleus and one or more neutrons collide and merge to form a heavier nucleus. The formation of the heavier nucleus absorbs radiation, which can prevent a criticality. The neutron absorption cross-section, $\sigma_a$, for elemental boron is 710±21 barns.

As shown in FIG. 1, the metallic composition 20 includes a metal component 22 and a borate component 24. The metal component 22 includes one or more metals or metallic elements that ionically bond to one or more elements within the borate component 24. In some embodiments, the metal component 22 can form a metallic compound with the entire borate component 24 or a portion thereof. The metallic compound has a low solubility in water.

In other embodiments, the metal component 22 can be a metal-bearing compound that forms a mixture with borate component 24. The metal-bearing compound can be any metal-bearing compound that forms a mixture with the borate component 24 that has a low solubility in water. Exemplary metal-bearing compounds can include a lead-bearing compound, a cadmium-bearing compound, a zinc-bearing compound, a manganese-bearing compound, an iron-bearing compound, a cobalt-bearing compound, a nickel-bearing compound, a copper-bearing compound, a tin-bearing compound, an antimony-bearing compound, a bismuth-bearing compound, a calcium-bearing compound, a calcium-sodium-bearing compound, and a magnesium-bearing compound.

In yet other embodiments, the metal component 22 can be a metal oxide or a metal hydroxide. The metal oxide or metal hydroxide can be any metal oxide or metal hydroxide that forms a mixture with the borate component 24 that has a low solubility in water. Exemplary metal oxides include lead oxide, cadmium oxide, zinc oxide, manganese oxide, iron oxide, cobalt oxide, nickel oxide, copper oxide, tin oxide, antimony oxide, bismuth oxide, calcium oxide, and magnesium oxide. Exemplary metal hydroxides include lead hydroxide, cadmium hydroxide, zinc hydroxide, manganese hydroxide, iron hydroxide, cobalt hydroxide, nickel hydroxide, copper hydroxide, tin hydroxide, antimony hydroxide, bismuth hydroxide, calcium hydroxide, and magnesium hydroxide.

Referring to FIG. 1, the borate component 24 can be a borate-containing material, such as a borate, a metaborate hydrate, a metaborate, a sodium tetraborate hydrate, or a borate-containing material that includes boric acid. An exemplary metallic composition that includes a metaborate hydrate is lead metaborate hydrate ($Pb(BO_2)_2.H_2O$) or expressed as lead borate hydroxide hydrate ($Pb_5B_3O_8(OH)_3.H_2O$), or lead boron oxide ($Pb_6B_{10}O_{21}$), lead borate hydrate ($PbB_4O_7.3H_2O$). Exemplary borates include lead borate, cadmium borate, zinc borate, manganese borate, iron borate, cobalt borate, nickel borate, copper borate, tin borate, bismuth borate, antimony borate, calcium borate, calcium and sodium borate, and magnesium borate.

Exemplary compositions for the borate component 24 that include metaborates include cadmium metaborate ($Cd(BO_2)_2$), zinc metaborate ($Zn(BO_2)_2.1.5H_2O$), manganese metaborate ($Mn(BO_2)_2.2H_2O$), iron metaborate ($Fe(BO_2)_2$), cobalt metaborate ($Co(BO_2)_2$), nickel metaborate ($Ni(BO_2)_2.2NiO$), copper metaborate ($Cu(BO_2)_2$), tin metaborate ($Sn(BO_2)_2.2SnO$), antimony metaborate ($Sb(BO_2)_2.2SbO$), and bismuth metaborate ($Bi(BO_2)_2.2BiO$).

An exemplary metallic composition that includes a sodium tetraborate hydrate can form a mixture of a lead-bearing compound and sodium tetraborate hydrate ($Na_2B_4O_7.10H_2O$). Other exemplary metallic compositions form mixtures, such as a mixture of a cadmium-bearing compound and sodium tetraborate hydrate ($Na_2B_4O_7.10H_2O$), a mixture of a zinc-bearing compound and sodium tetraborate hydrate ($Na_2B_4O_7.10H_2O$), a mixture of a manganese-bearing compound and sodium tetraborate hydrate ($Na_2B_4O_7.10H_2O$), a mixture of an iron-bearing compound and sodium tetraborate hydrate ($Na_2B_4O_7.10H_2O$), a mixture of a cobalt-bearing compound and sodium tetraborate hydrate ($Na_2B_4O_7.10H_2O$), a mixture of a nickel-bearing compound and sodium tetraborate hydrate ($Na_2B_4O_7.10H_2O$), a mixture of a copper-bearing compound and sodium tetraborate hydrate ($Na_2B_4O_7.10H_2O$), a mixture of a tin-bearing compound and sodium tetraborate hydrate ($Na_2B_4O_7.10H_2O$), a mixture of a calcium-bearing compound and sodium tetraborate hydrate ($Na_2B_4O_7.10H_2O$), and a mixture of a magnesium-bearing compound and sodium tetraborate hydrate ($Na_2B_4O_7.10H_2O$).

Exemplary mixtures that include borate-containing materials with boric acid can be a mixture of lead oxide or hydroxide and boric acid ($H_3BO_3$), a mixture of cadmium oxide or hydroxide and boric acid ($H_3BO_3$), a mixture of zinc oxide or hydroxide and boric acid ($H_3BO_3$), a mixture of manganese oxide or hydroxide and boric acid ($H_3BO_3$), a mixture of iron oxide or hydroxide and boric acid ($H_3BO_3$), a mixture of cobalt oxide or hydroxide and boric acid ($H_3BO_3$), a mixture of nickel oxide or hydroxide and boric acid ($H_3BO_3$), a mixture of copper oxide or hydroxide and boric acid ($H_3BO_3$), a mixture of tin oxide or hydroxide and boric acid ($H_3BO_3$), a mixture of calcium oxide or hydroxide and boric acid ($H_3BO_3$), and a mixture of magnesium oxide or hydroxide and boric acid ($H_3BO_3$).

The metal component 22 can include one or more metals or metallic elements that form compounds or mixtures with metaborate hydrates, metaborates, sodium tetraborate hydrates, boric acid, or other borate-containing materials that have low solubility constants. An exemplary reaction for lead metaborate hydrate is set forth, as follows:

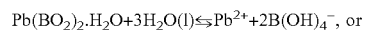

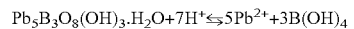

The solubility constant, ($\log_{10} K^0$), for reaction can be −12, which represents a low solubility in water. Other exemplary borate-containing materials will have similar solubilities in water due to the chemical similarity between the materials.

The metal component 22 can include any metal that forms a compound or mixture that has a solubility constant ($\log_{10} K^0$ of −4.0 or less. The metal can be a heavy metal and/or a transition metal, and/or an alkaline earth metal. Heavy metals can include metals having relatively high densities, high atomic weights, high atomic numbers, and/or certain chemical properties. As many as 96 of the known 118 chemical elements, including lead, bismuth, the transition elements, actinides, lanthanides, and the rare earth elements can be described as heavy metals.

The metal component 22 can include any metal that bonds to borate containing materials in a similar manner as lead. Exemplary metals include cadmium, zinc, manganese, iron, cobalt, nickel, copper, tin, antimony, and bismuth. In some embodiments, the metal can be a divalent cation, a trivalent cation, a mixture of divalent cations, a mixture of trivalent cations, or a mixture of both divalent and trivalent cations. In other embodiments, the metal can be a soft acid or an intermediate acid, as understood under the Pearson acid-base concept.

The use of cadmium, as part of the metal component, can have other benefits. Specifically, cadmium has a large cross-section for neutron capture (i.e., $\sigma_a$=2410±110 barns).

Figure 2:
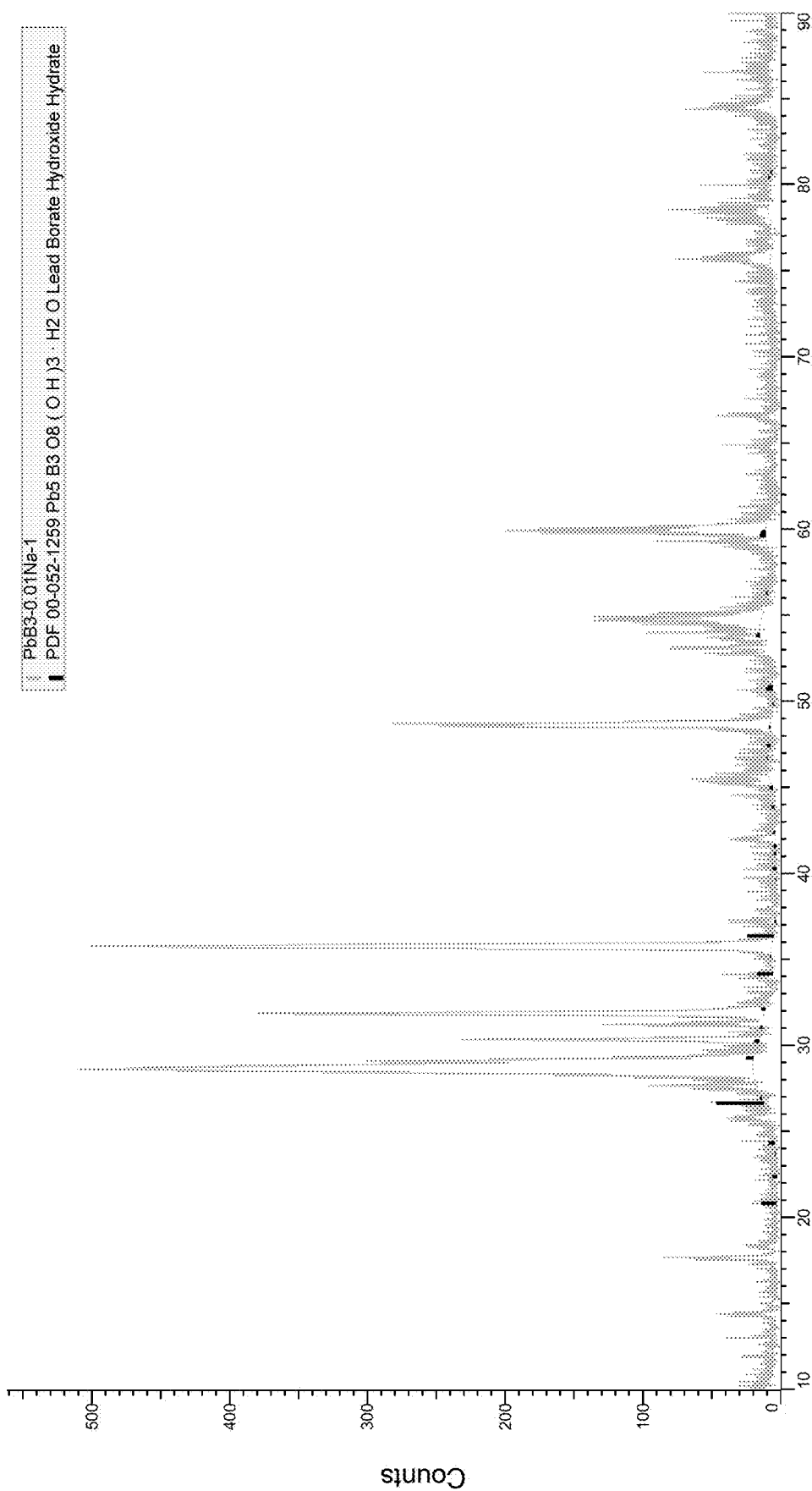
FIG. 2 shows a graph depicting the formation of lead borate hydroxide hydrate $(Pb_5B_3O_8(OH)_3.H_2O)$ in 0.01 m $NaCl+0.03$ m $H_3BO_3$ with 2.0129 grams of PbO solid at 22.5° C.

Referring next to FIG. 2, the formation of lead borate hydroxide hydrate ($Pb_5B_3O_8(OH)_3.H_2O$) in 0.01 m NaCl+ 0.03 m $H_3BO_3$ with 2.0129 grams of PbO solid at 22.5° C. is shown.

Figure 3:
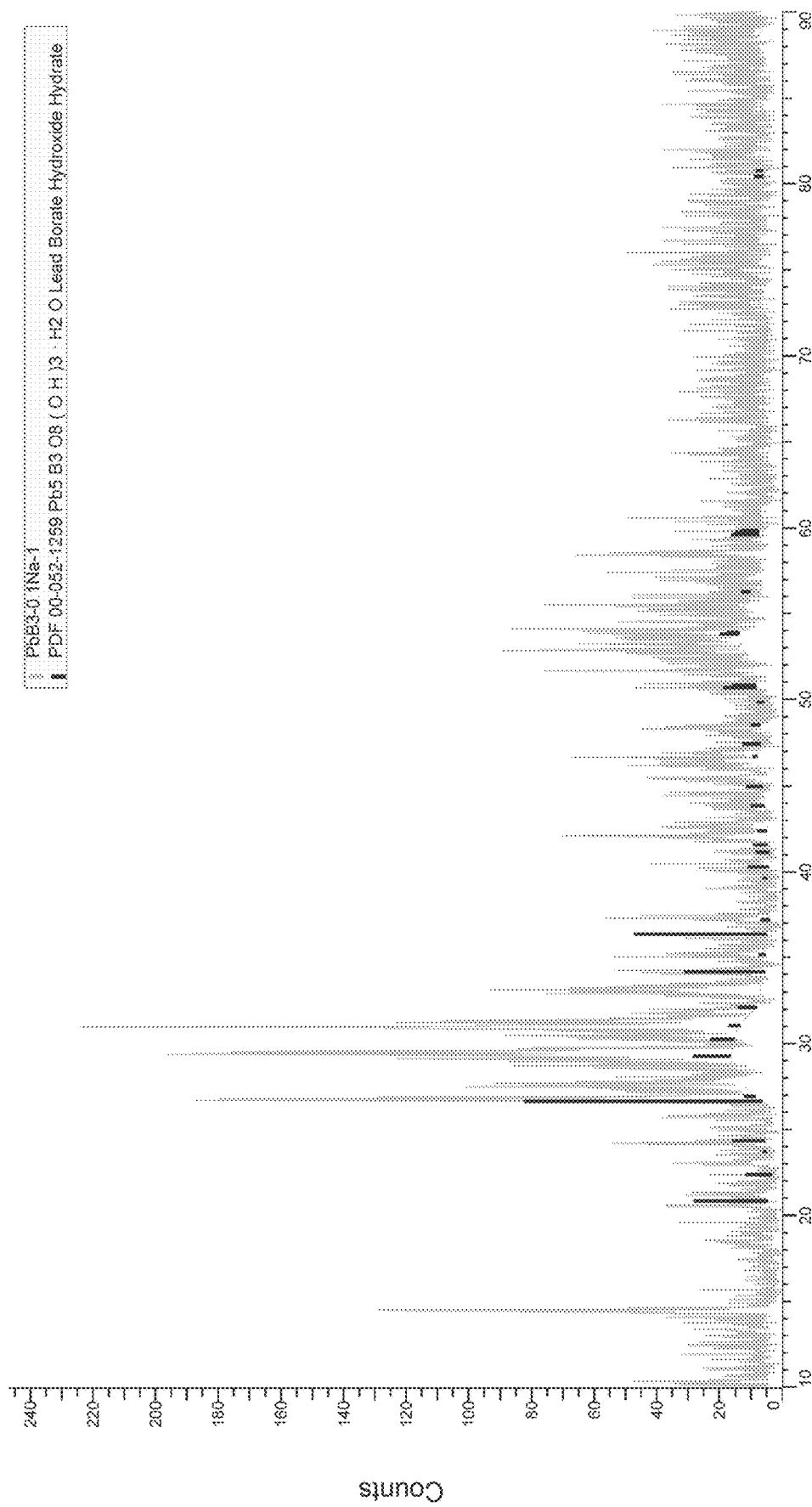
FIG. 3 shows a graph depicting the formation of lead borate hydroxide hydrate $(Pb_5B_3O_8(OH)_3.H_2O)$ in 0.1 m $NaCl+0.03$ m $H_3BO_3$ with 2.0045 grams of PbO solid at 22.5° C.

Referring next to FIG. 3, the formation of lead borate hydroxide hydrate ($Pb_5B_3O_8(OH)_3.H_2O$) in 0.1 m NaCl+ 0.03 m $H_3BO_3$ with 2.0045 grams of PbO solid at 22.5° C. is shown.

Figure 4:
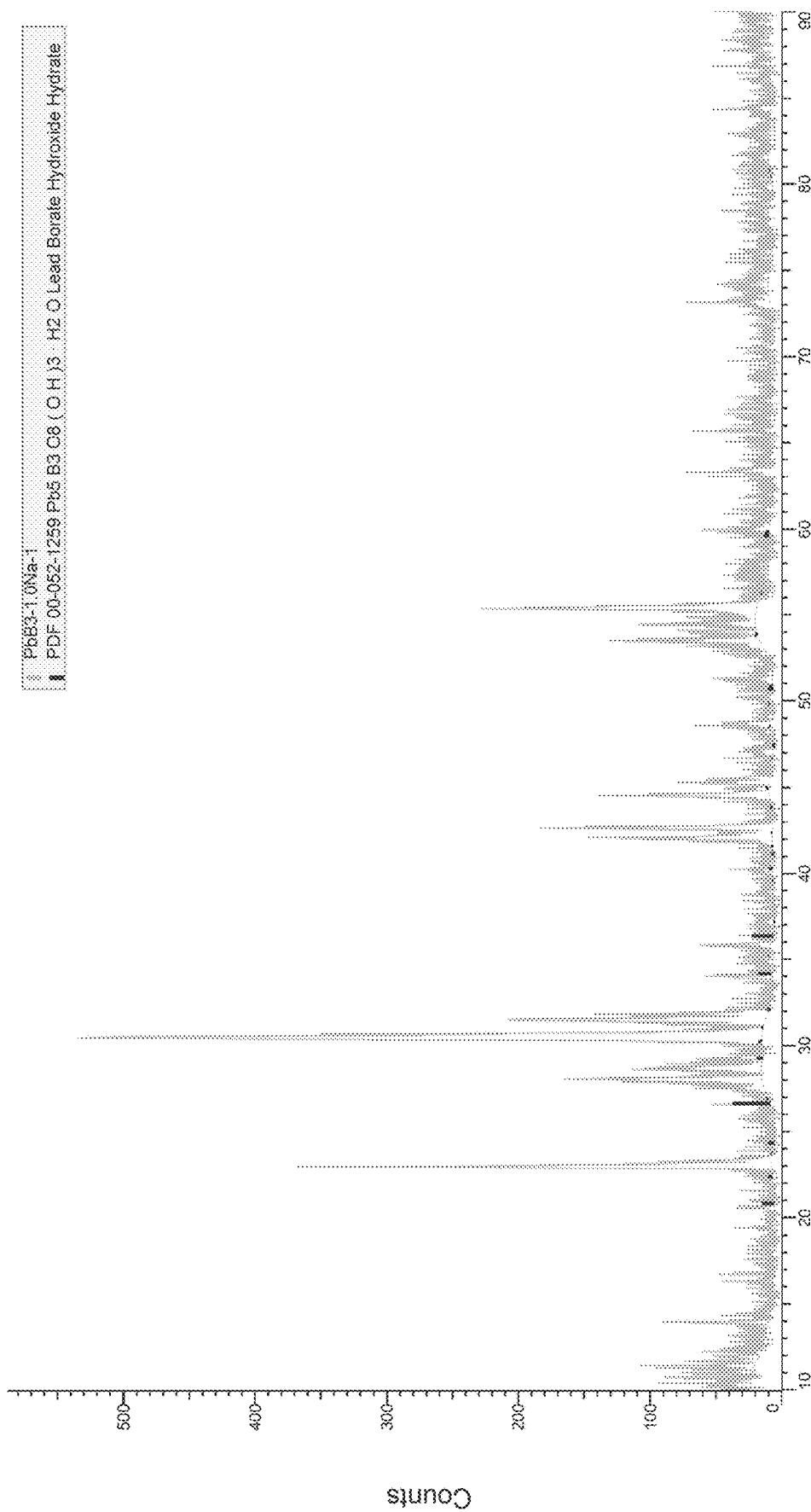
FIG. 4 shows a graph depicting the formation of lead borate hydroxide hydrate $(Pb_5B_3O_8(OH)_3.H_2O)$ in 1.0 m $NaCl+0.03$ m $H_3BO_3$ with 2.0303 grams of PbO solid at 22.5° C.

Referring next to FIG. 4, the formation of lead borate hydroxide hydrate ($Pb_5B_3O_8(OH)_3.H_2O$) in 1.0 m NaCl+ 0.03 m $H_3BO_3$ with 2.0303 grams of PbO solid at 22.5° C. is shown.

Figure 5:
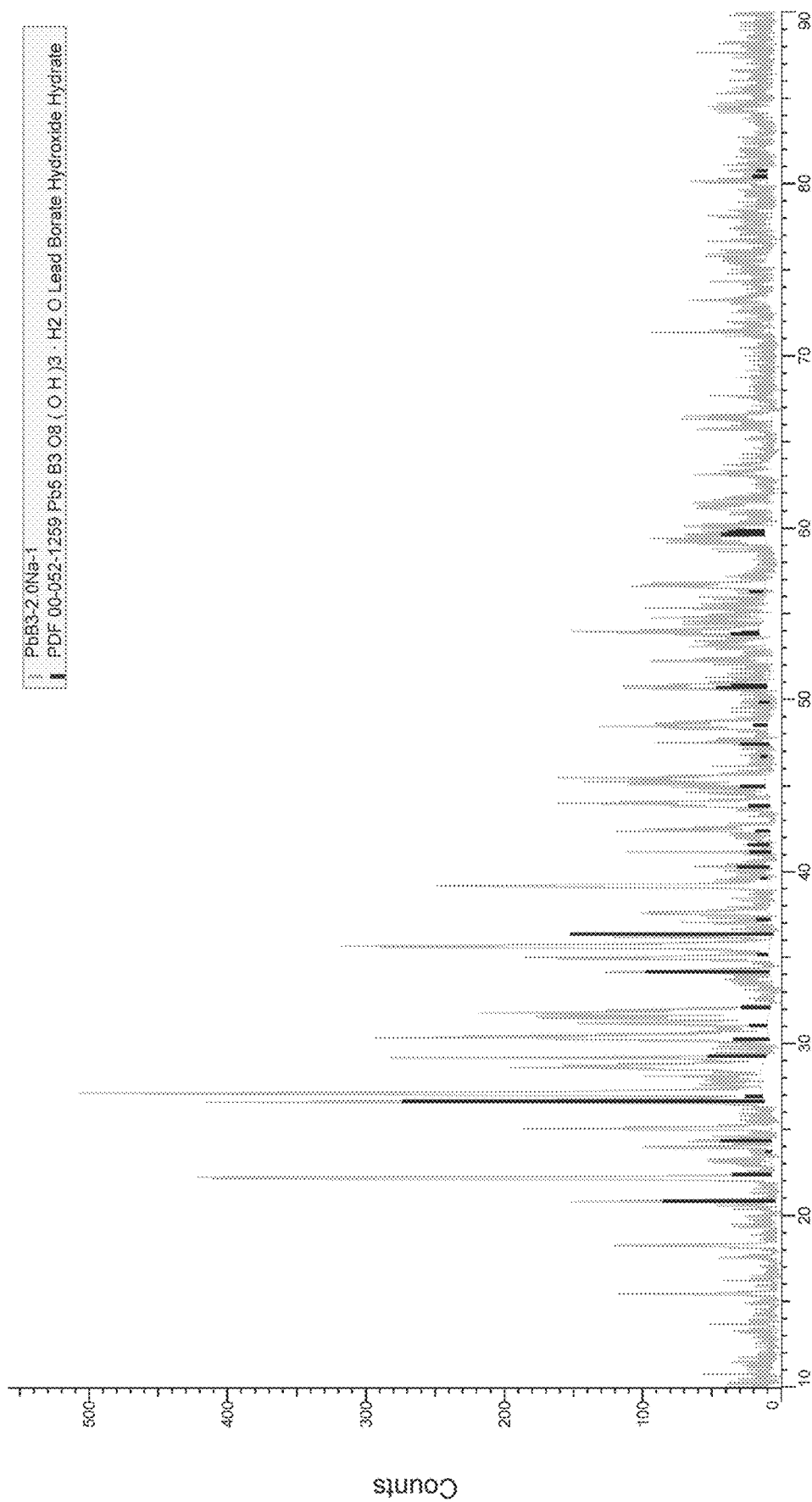
FIG. 5 shows a graph depicting the formation of lead borate hydroxide hydrate $(Pb_5B_3O_8(OH)_3.H_2O)$ in 2.1 m $NaCl+0.03$ m $H_3BO_3$ with 2.0117 grams of PbO solid at 22.5° C.

Referring next to FIG. 5, the formation of lead borate hydroxide hydrate ($Pb_5B_3O_8(OH)_3.H_2O$) in 2.1 m NaCl+ 0.03 m $H_3BO_3$ with 2.0117 grams of PbO solid at 22.5° C. is shown.

Figure 6:
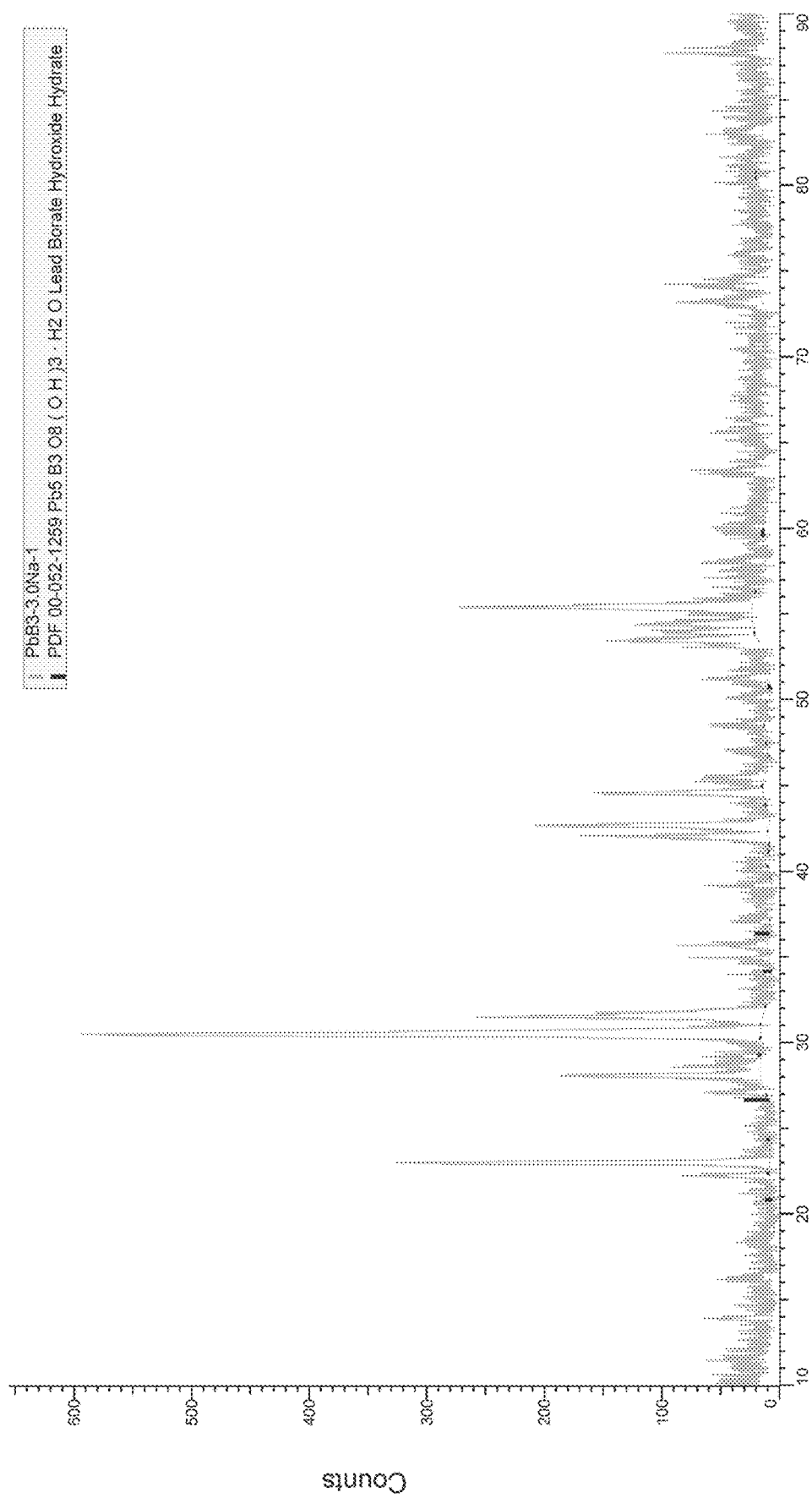
FIG. 6 shows a graph depicting the formation of lead borate hydroxide hydrate ($Pb_5B_3O_8(OH)_3 \cdot H_2O$) in 3.2 m $NaCl+0.03$ m $H_3BO_3$ with 2.0057 grams of PbO solid at 22.5° C.

Referring next to FIG. 6, the formation of lead borate hydroxide hydrate ($Pb_5B_3O_8(OH)_3.H_2O$) in 3.2 m NaCl+ 0.03 m $H_3BO_3$ with 2.0057 grams of PbO solid at 22.5° C. is shown.

Figure 7:
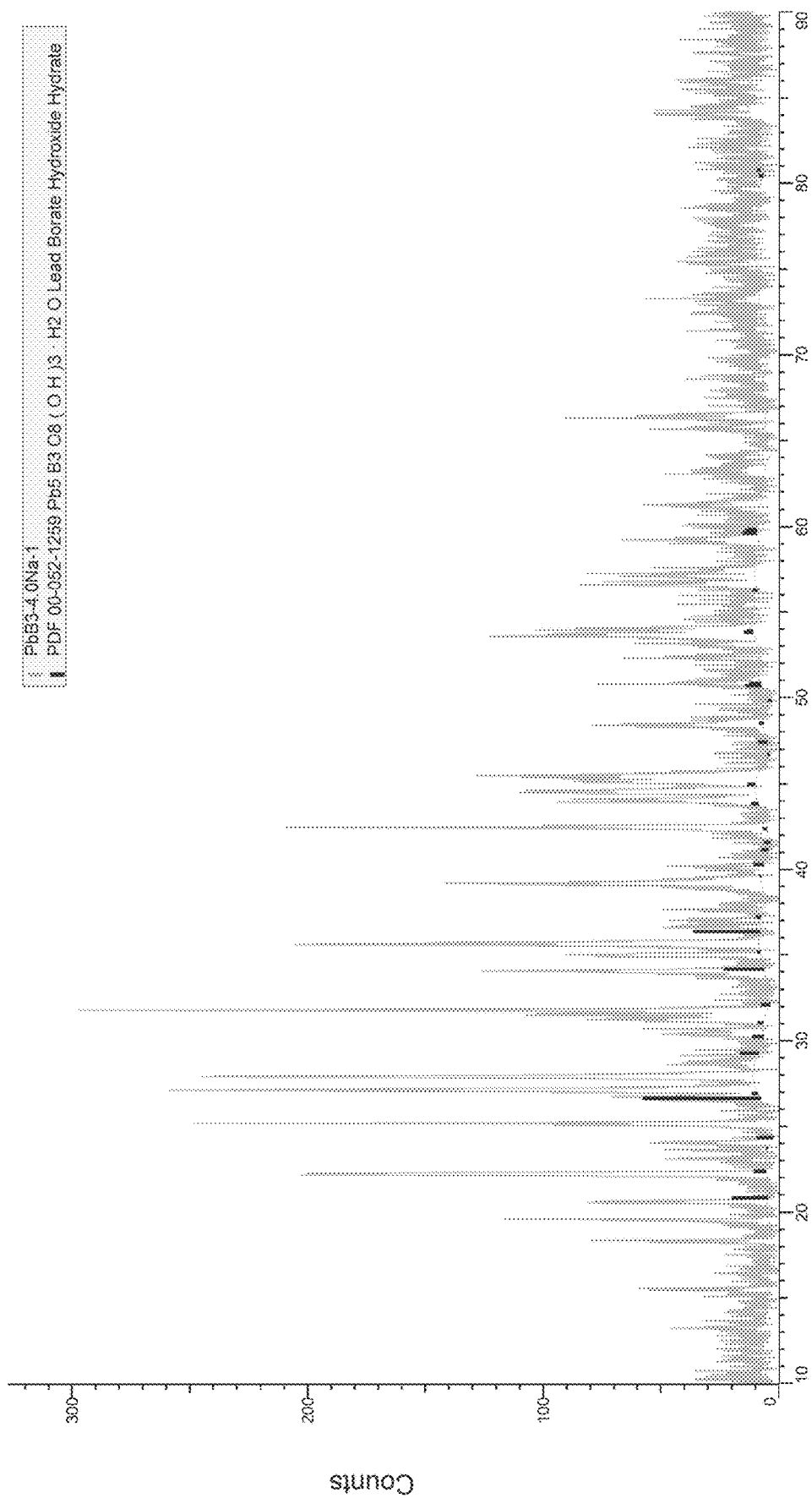
FIG. 7 shows a graph depicting the formation of lead borate hydroxide hydrate ($Pb_5B_3O_8(OH)_3 \cdot H_2O$) in 4.4 m $NaCl+0.03$ m $H_3BO_3$ with 2.0029 grams of PbO solid at 22.5° C.

Referring next to FIG. 7, the formation of lead borate hydroxide hydrate ($Pb_5B_3O_8(OH)_3.H_2O$) in 4.4 m NaCl+ 0.03 m $H_3BO_3$ with 2.0029 grams of PbO solid at 22.5° C. is shown.

Figure 8:
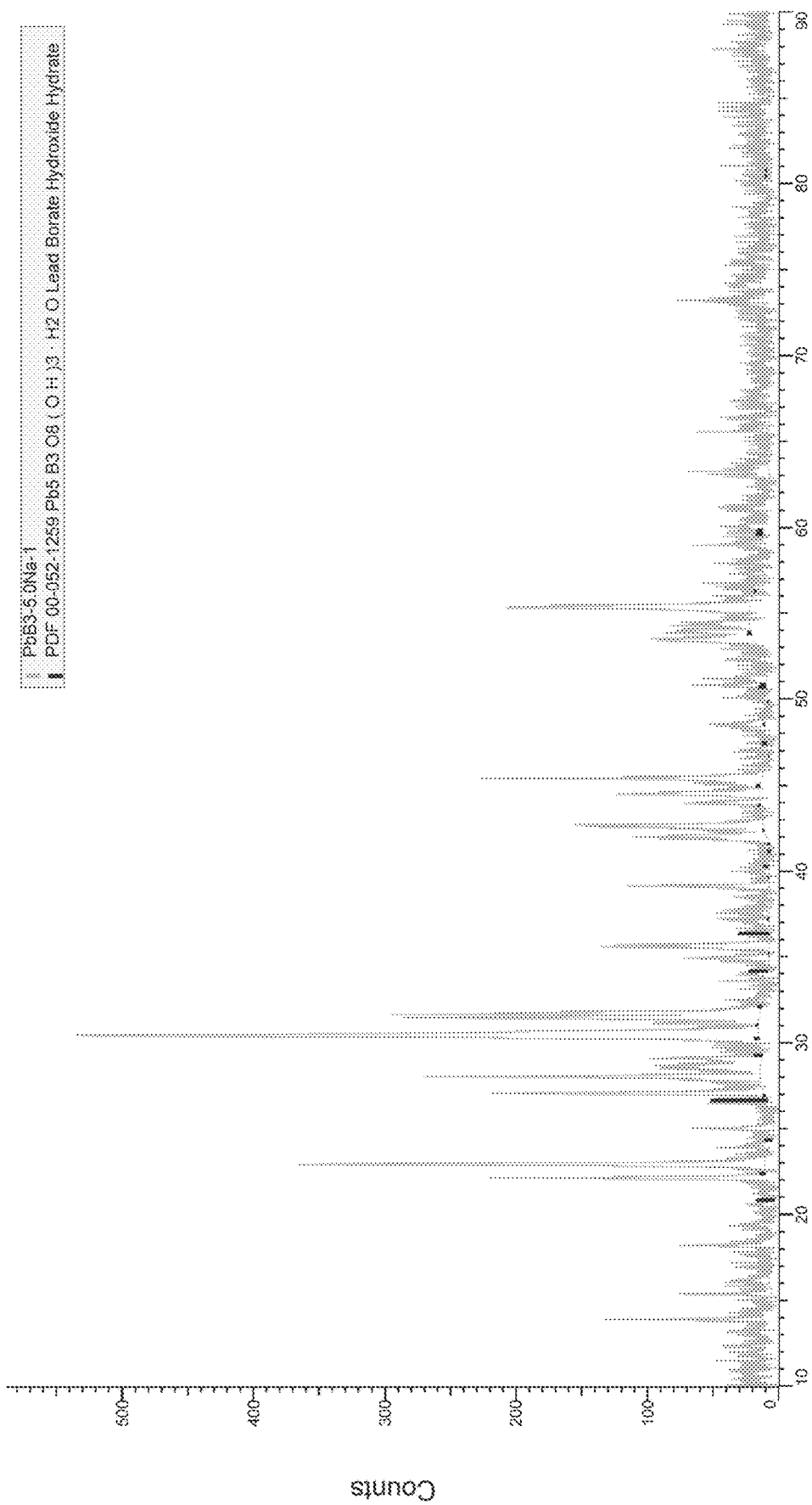
FIG. 8 shows a graph depicting the formation of lead borate hydroxide hydrate ($Pb_5B_3O_8(OH)_3 \cdot H_2O$) in 5.0 m $NaCl+0.03$ m $H_3BO_3$ with 2.0130 grams of PbO solid at 22.5° C.

Referring next to FIG. 8, the formation of lead borate hydroxide hydrate ($Pb_5B_3O_8(OH)_3.H_2O$) in 5.0 m NaCl+ 0.03 m $H_3BO_3$ with 2.0130 grams of PbO solid at 22.5° C. is shown.

Figure 9:
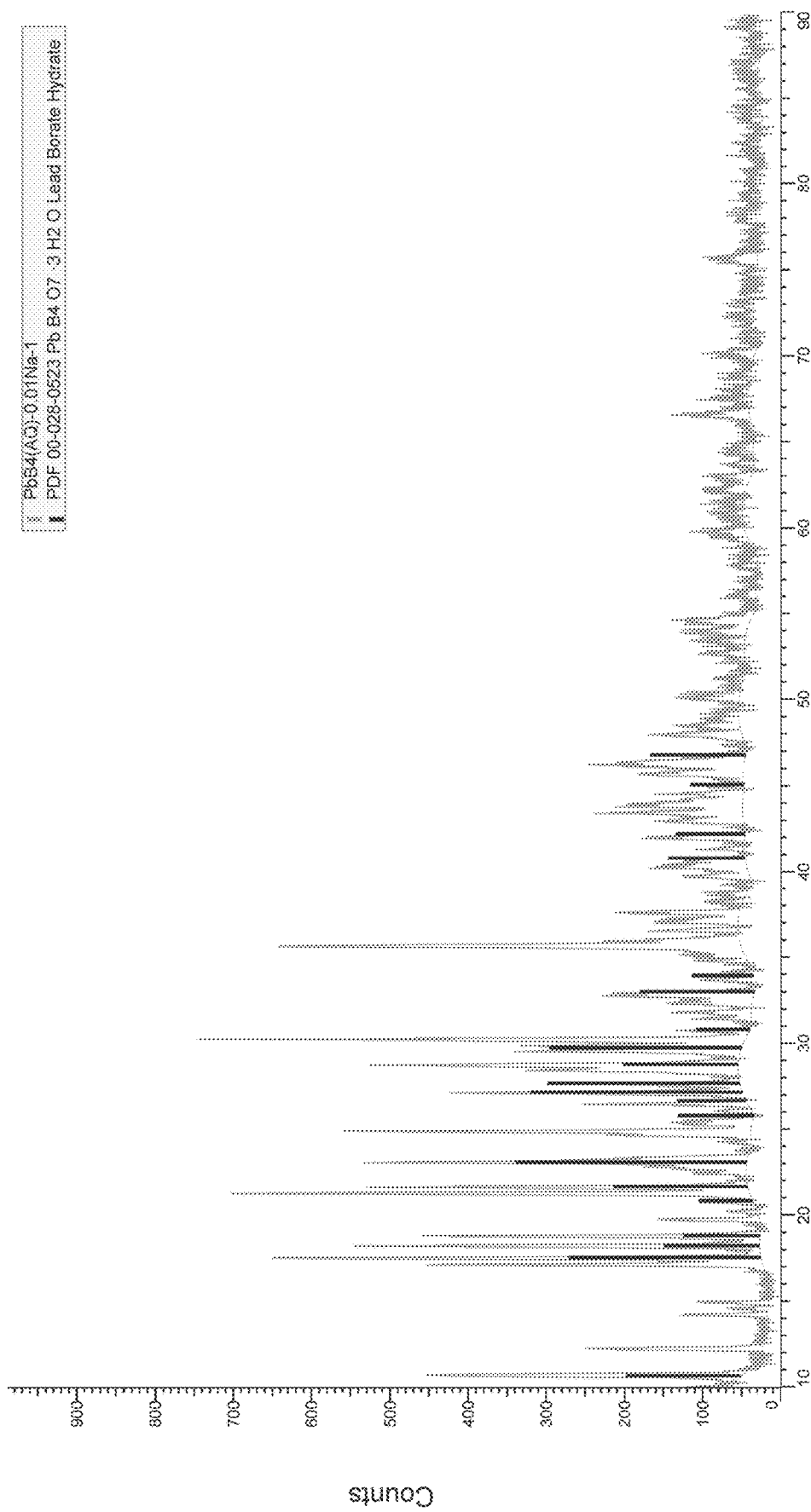
FIG. 9 shows a graph depicting the formation of lead borate hydrate ($PbB_4O_7 \cdot 3H_2O$) in 0.01 m $NaCl+0.3$ m $H_3BO_3$ with 2.0007 grams of PbO solid at 22.5° C.

Referring next to FIG. 9, the formation of lead borate hydrate ($PbB_4O_7.3H_2O$) in 0.01 m NaCl+0.3 m $H_3BO_3$ with 2.0007 grams of PbO solid at 22.5° C. is shown.

Figure 10:
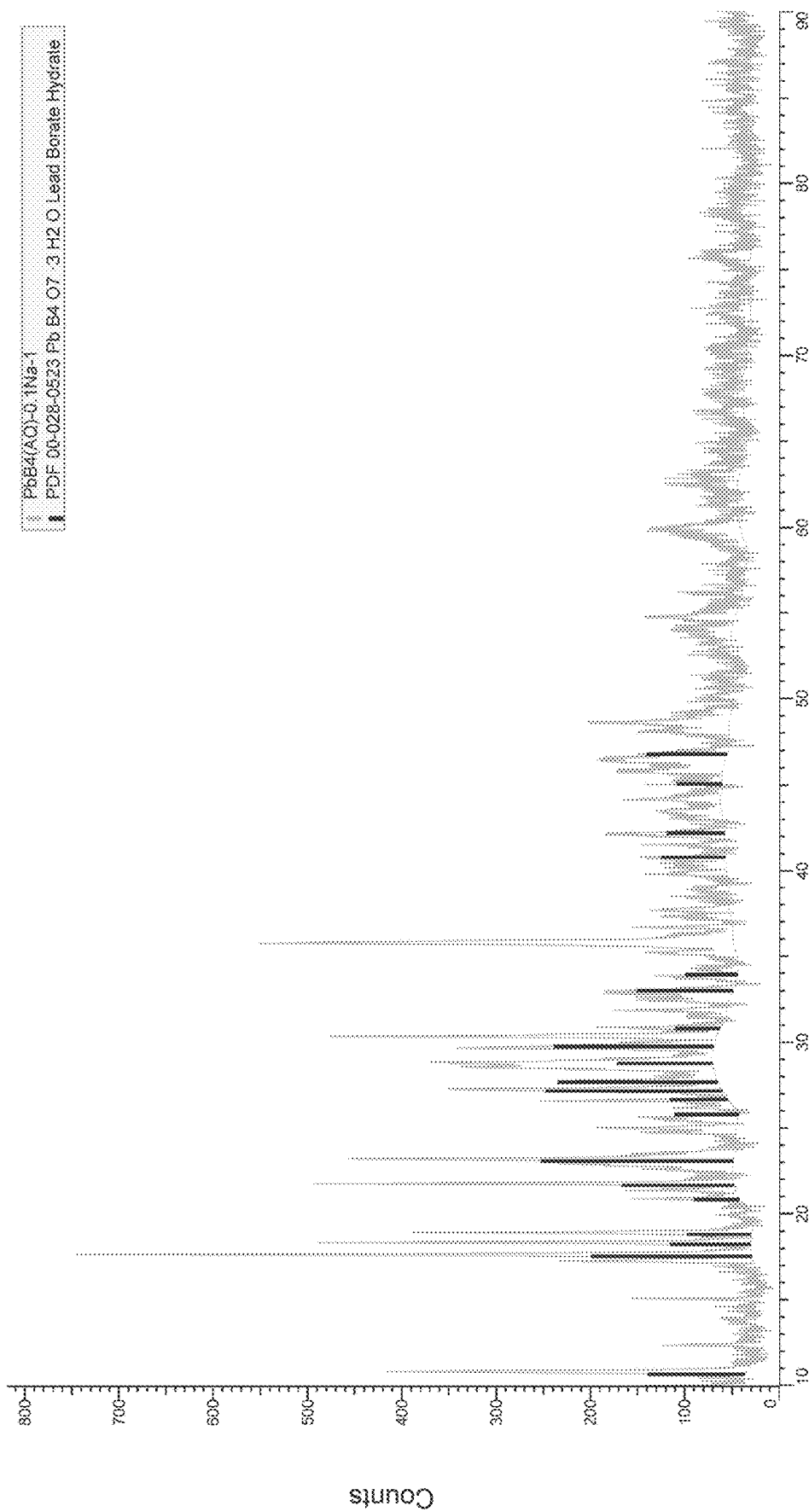
FIG. 10 shows a graph depicting the formation of lead borate hydrate ($PbB_4O_7 \cdot 3H_2O$) in 0.1 m $NaCl+0.3$ m $H_3BO_3$ with 2.0001 grams of PbO solid at 22.5° C.

Referring next to FIG. 10, the formation of lead borate hydrate ($PbB_4O_7.3H_2O$) in 0.1 m NaCl+0.3 m $H_3BO_3$ with 2.0001 grams of PbO solid at 22.5° C. is shown.

Figure 11:
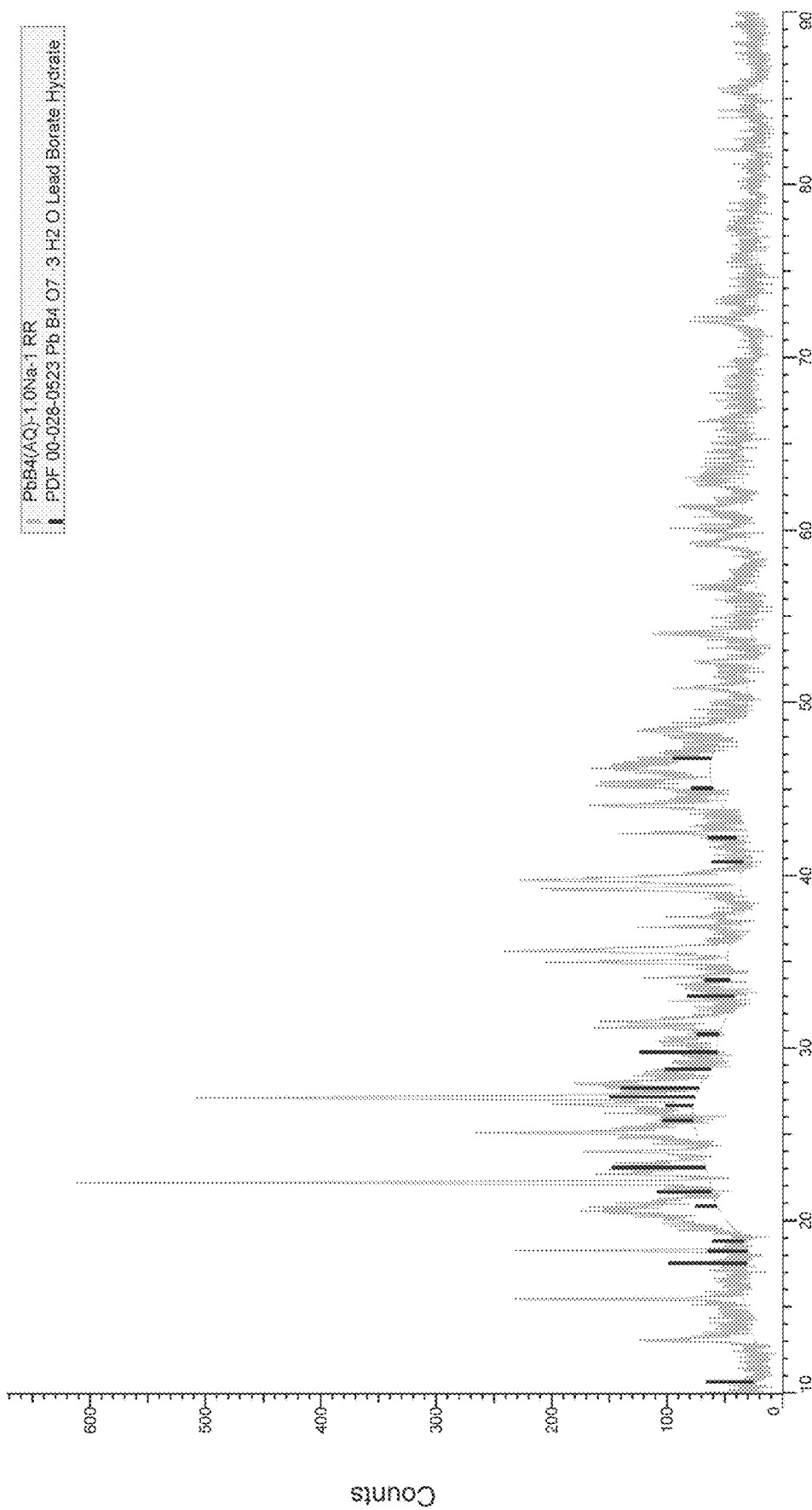
FIG. 11 shows a graph depicting the formation of lead borate hydrate ($PbB_4O_7 \cdot 3H_2O$) in 1.0 m $NaCl+0.3$ m $H_3BO_3$ with 2.0004 grams of PbO solid at 22.5° C.

Referring next to FIG. 11, the formation of lead borate hydrate ($PbB_4O_7.3H_2O$) in 1.0 m NaCl+0.3 m $H_3BO_3$ with 2.0004 grams of PbO solid at 22.5° C. is shown.

Figure 12:
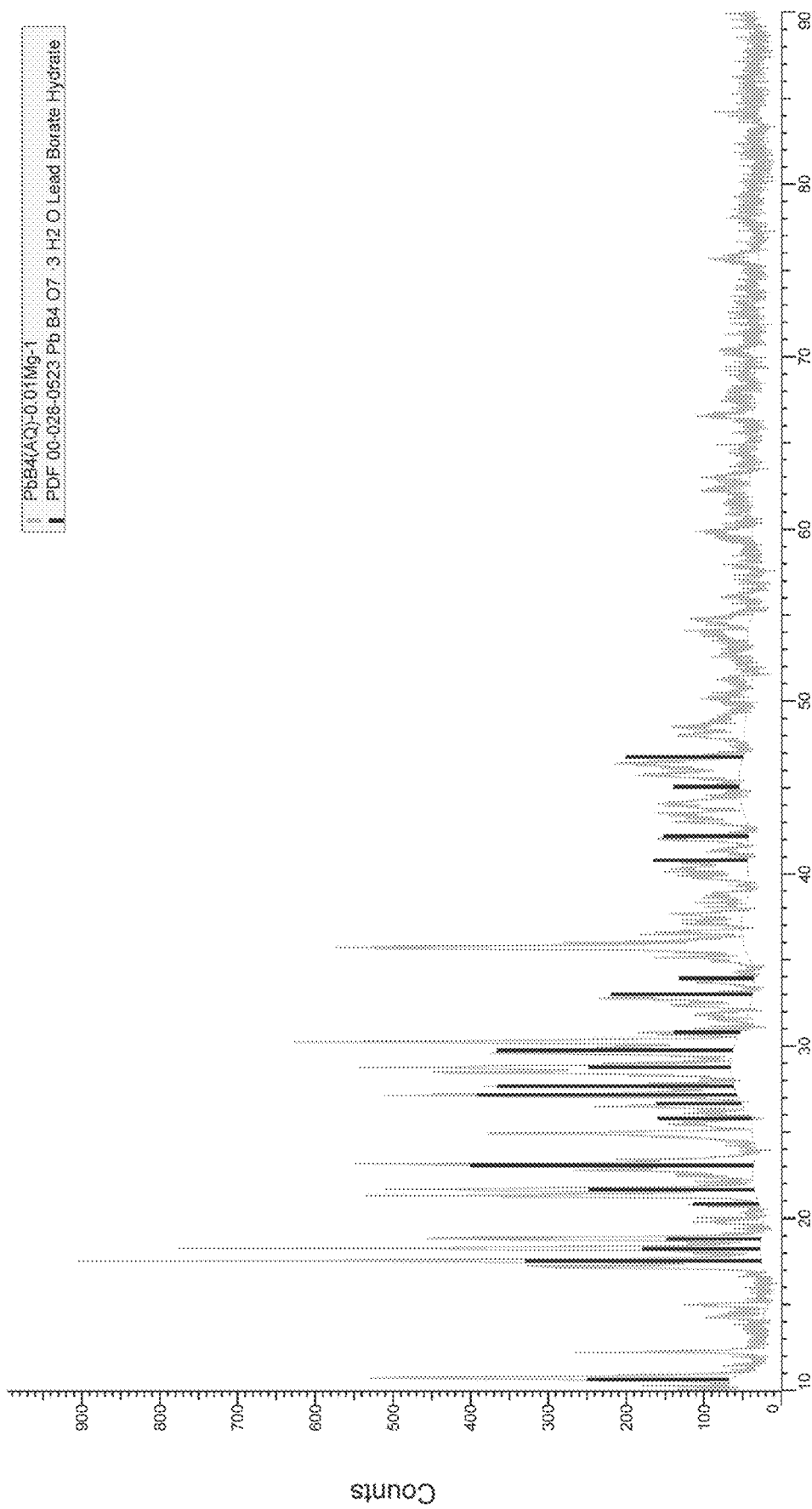
FIG. 12 shows a graph depicting the formation of lead borate hydrate ($PbB_4O_7 \cdot 3H_2O$ O) in 0.01 m $MgCl_2+0.3$ m $H_3BO_3$ with 2.0004 grams of $Pb_0$ solid at 22.5° C.

Referring next to FIG. 12, the formation of lead borate hydrate ($PbB_4O_7.3H_2O$) in 0.01 m $MgCl_2$+0.3 m $H_3BO_3$ with 2.0004 grams of PbO solid at 22.5° C. is shown.

Figure 13:
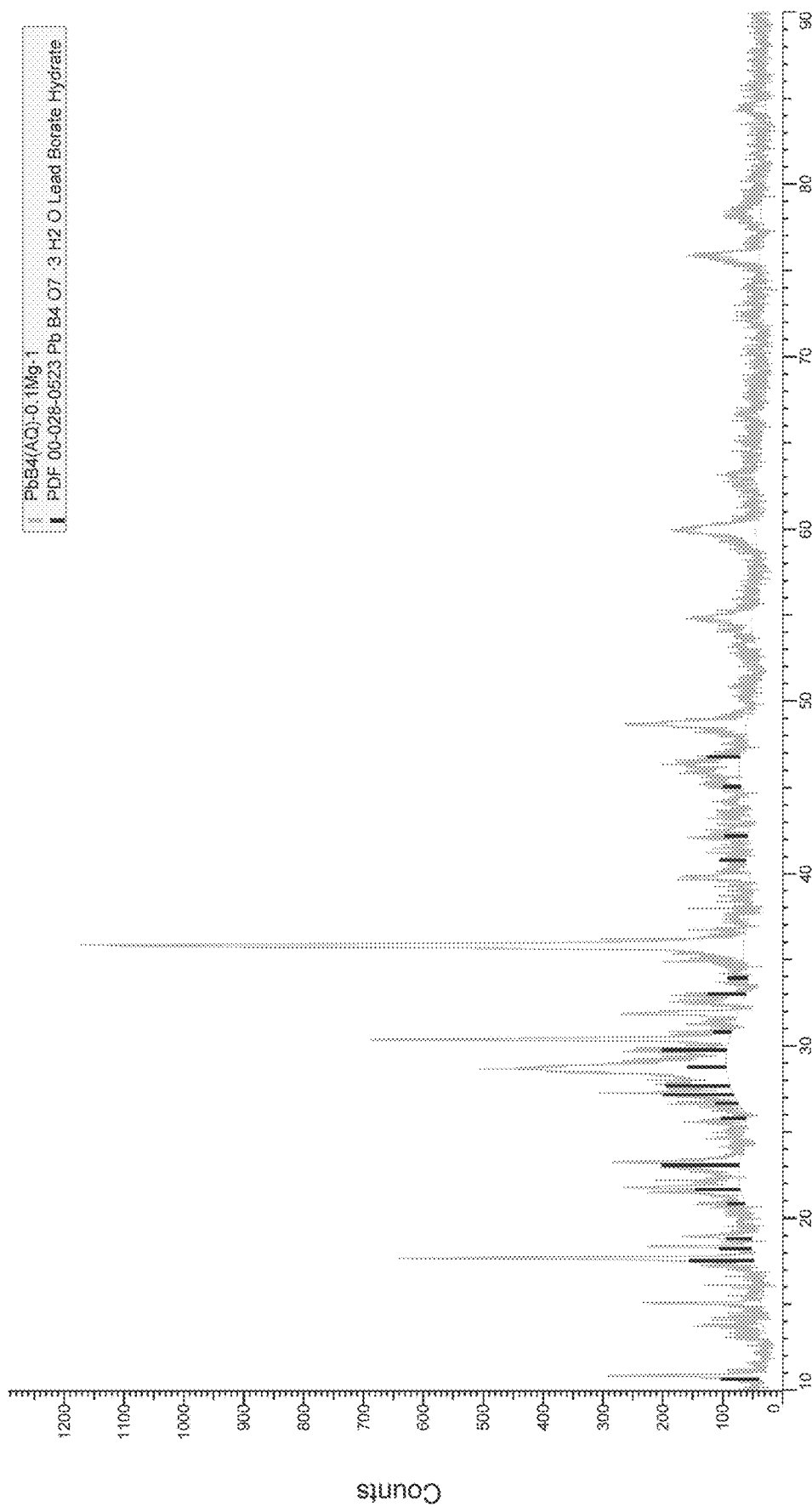
FIG. 13 shows a graph depicting the formation of lead borate hydrate ($PbB_4O_7 \cdot 3H_2O$) in 0.1 m $MgCl_2+0.3$ m $H_3BO_3$ with 2.0006 grams of $Pb_0$ solid at 22.5° C.

Referring next to FIG. 13, the formation of lead borate hydrate ($PbB_4O_7.3H_2O$) in 0.1 m $MgCl_2$+0.3 m $H_3BO_3$ with 2.0006 grams of PbO solid at 22.5° C. is shown.

Figure 14:
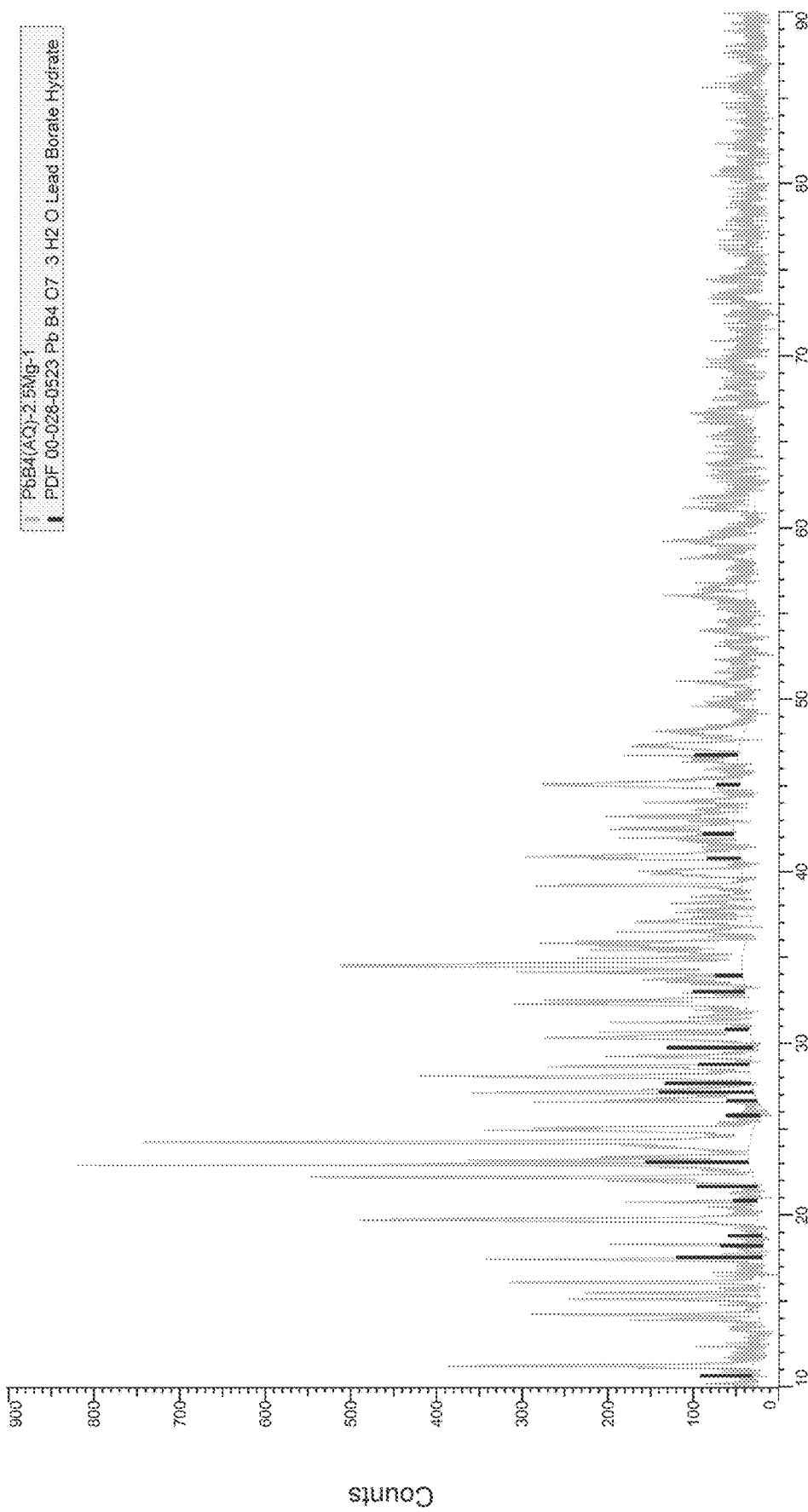
FIG. 14 shows a graph depicting the formation of lead borate hydrate ($PbB_4O_7 \cdot 3H_2O$) in 2.5 m $MgCl_2+0.3$ m $H_3BO_3$ with 2.0000 grams of $Pb_0$ solid at 22.5° C. Notice that lead metaborate hydrate ($Pb(BO2)2 \cdot H_2O$) was not present in the XRD database used for the analysis.

Referring next to FIG. 14, the formation of lead borate hydrate ($PbB_4O_77H_2O$) in 2.5 m $MgCl_2$+0.3 m $H_3BO_3$ with 2.0000 grams of PbO solid at 22.5° C. is shown. Notice that lead metaborate hydrate ($Pb(BO_2)_2H_2O$) was not present in the XRD database used for the analysis.

Figure 15:
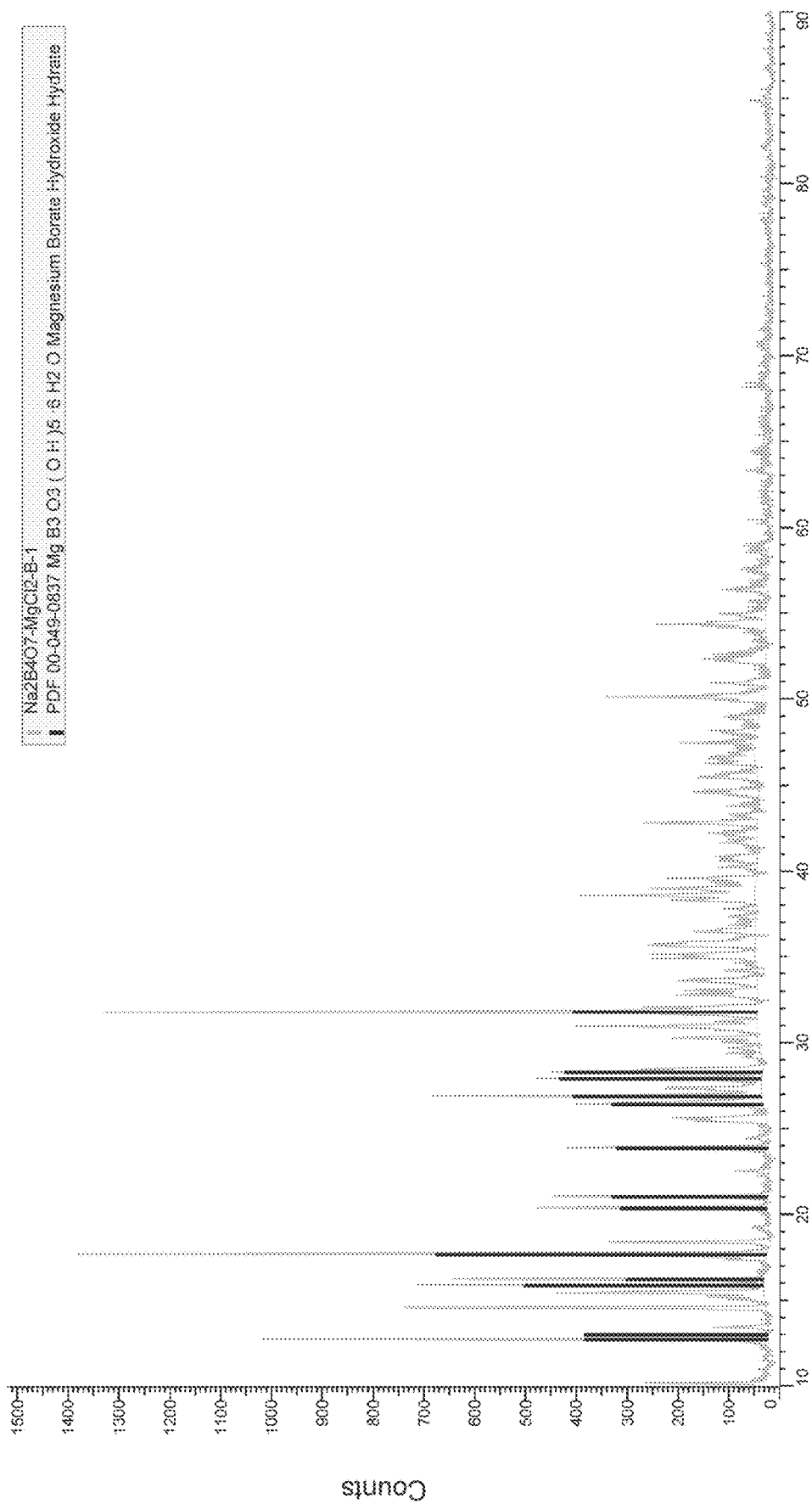
FIG. 15 shows a graph depicting the formation of magnesium borate hydroxide hydrate ($MgB_3O_3(OH)_5 \cdot 6H_2O$) in 0.8 m $MgCl_2+3.5$ m NaCl with 10.0029 grams of borax (Na2B4O7.10H2O) solid at 22.5° C.

Referring next to FIG. 15, the formation of magnesium borate hydroxide hydrate ($MgB_3O_3(OH)_5.6H_2O$) in 0.8 m $MgCl_2$+3.5 m NaCl with 10.0029 grams of borax ($Na_2B_4O_7.10H_2O$) solid at 22.5° C. is shown.

Figure 16:
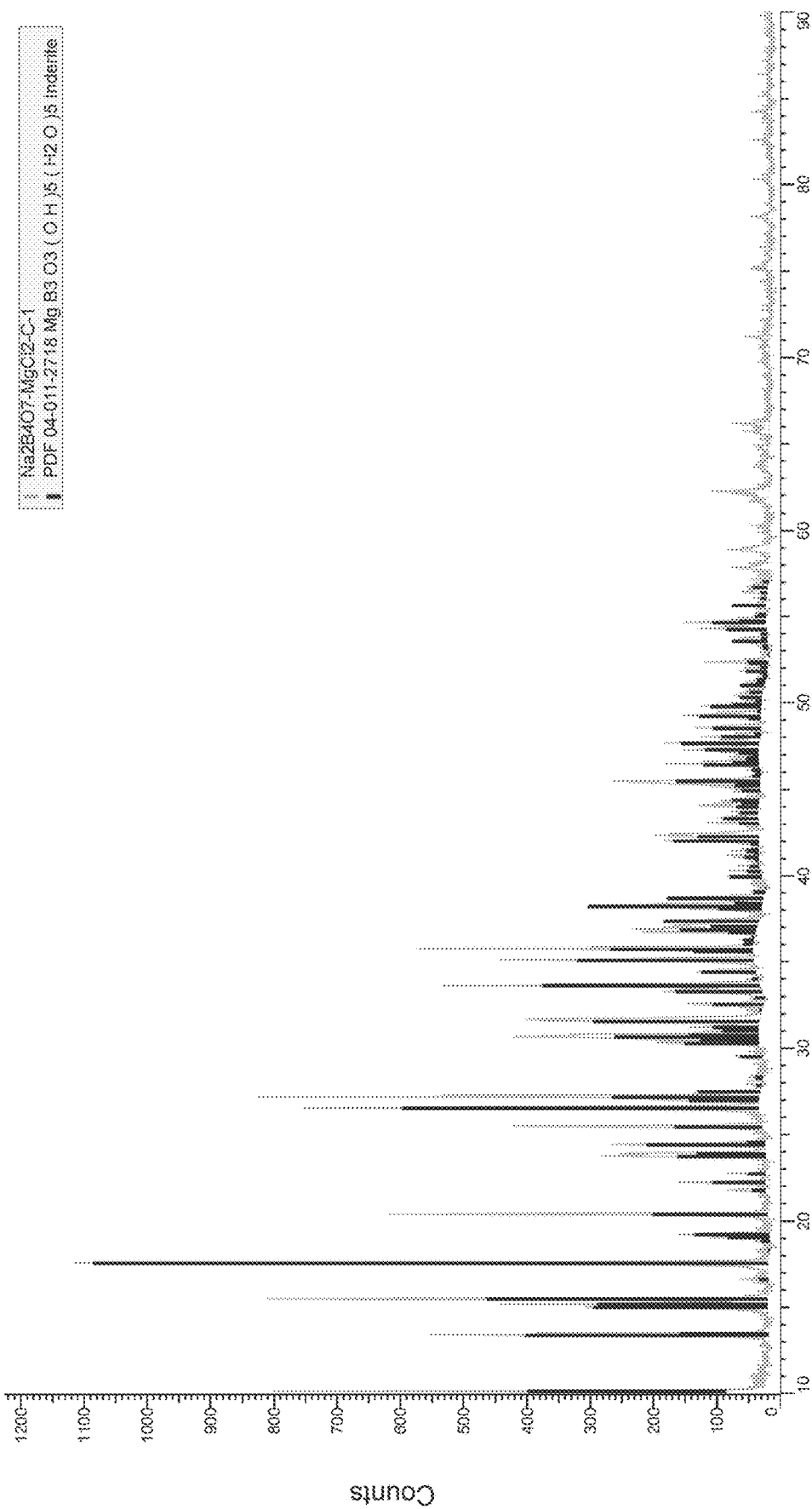
FIG. 16 shows a graph depicting the formation of inderite ($MgB_3O_3(OH)_5 \cdot 5H_2O$) in 1.25 m $MgCl_2+3.0$ m NaCl with 10.0084 grams of borax (Na2B4O7.10H2O) solid at 22.5° C.

Referring next to FIG. 16, the formation of inderite ($MgB_3O_3(OH)_5.5H_2O$) in 1.25 m $MgCl_2$+3.0 m NaCl with 10.0084 grams of borax ($Na_2B_4O_7.10H_2O$) solid at 22.5° C. is shown.

Figure 17:
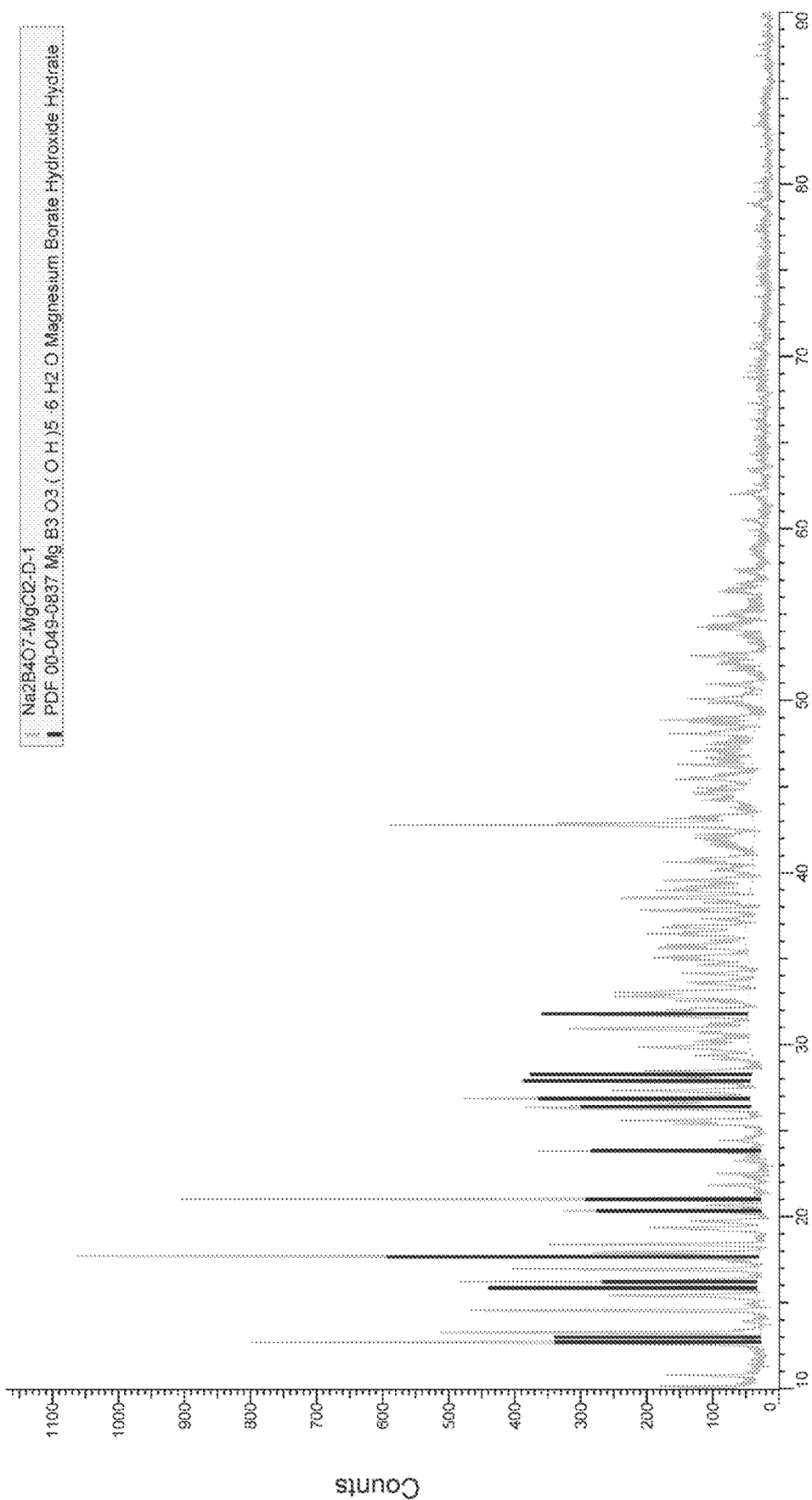
FIG. 17 shows a graph depicting the formation of magnesium borate hydroxide hydrate ($MgB_3O_3(OH)_5 \cdot 6H_2O$) in 1.50 m $MgCl_2+2.0$ m NaCl with 10.0088 grams of borax (Na2B4O7.10H2O) solid at 22.5° C.

Referring next to FIG. 17, the formation of magnesium borate hydroxide hydrate ($MgB_3O_3(OH)_5.6H_2O$) in 1.50 m $MgCl_2$+2.0 m NaCl with 10.0088 grams of borax ($Na_2B_4O_7.10H_2O$) solid at 22.5° C. is shown.

Figure 18:
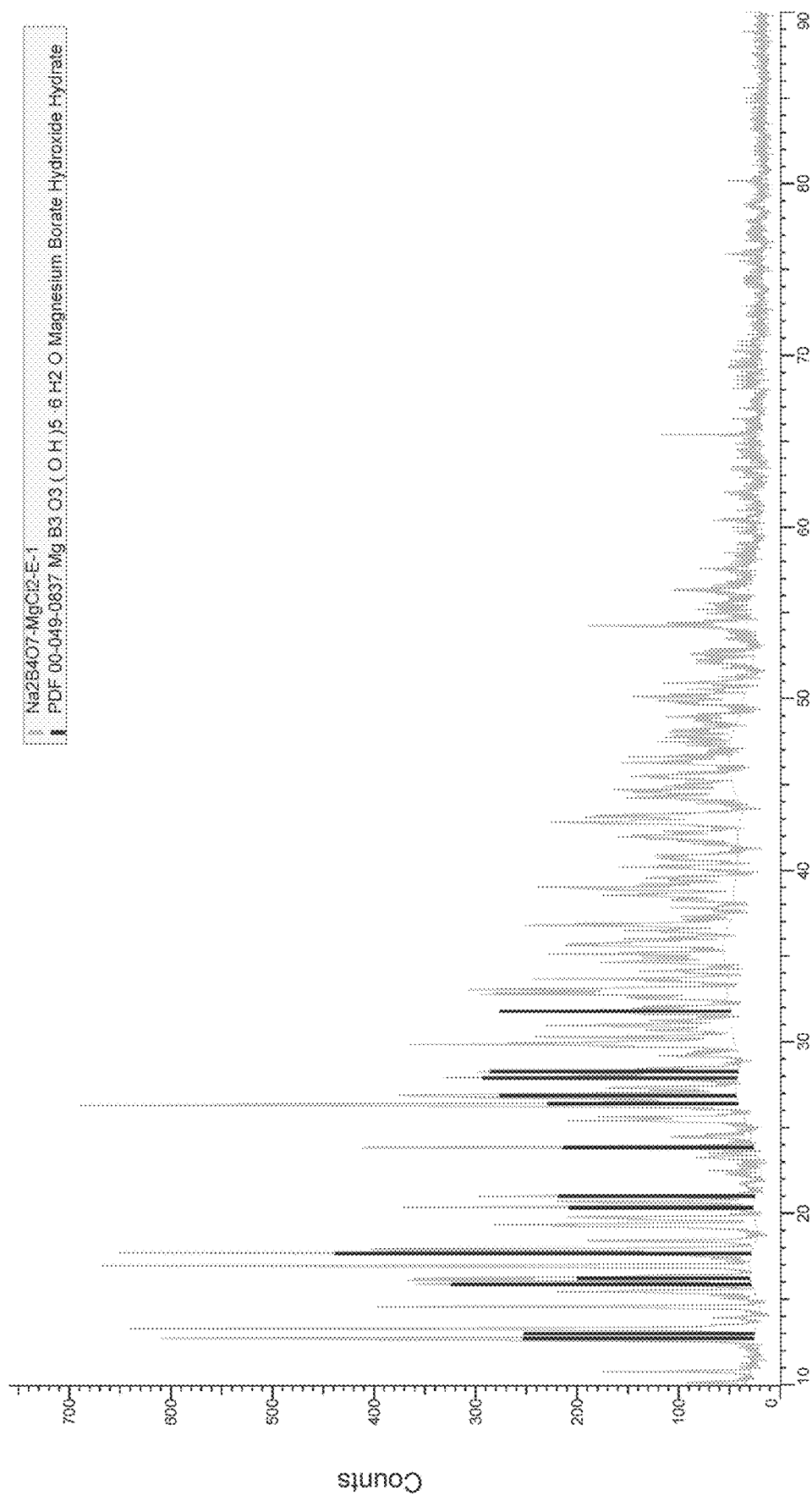
FIG. 18 shows a graph depicting the formation of magnesium borate hydroxide hydrate ($MgB_3O_3(OH)_5 \cdot 6H_2O$) in 1.75 m $MgCl_2+1.5$ m NaCl with 10.0049 grams of borax (Na2B4O7.10H2O) solid at 22.5° C.

Referring next to FIG. 18, the formation of magnesium borate hydroxide hydrate ($MgB_3O_3(OH)_5.6H_2O$) in 1.75 m $MgCl_2$+1.5 m NaCl with 10.0049 grams of borax ($Na_2B_4O_7.10H_2O$) solid at 22.5° C. is shown.

Figure 19:
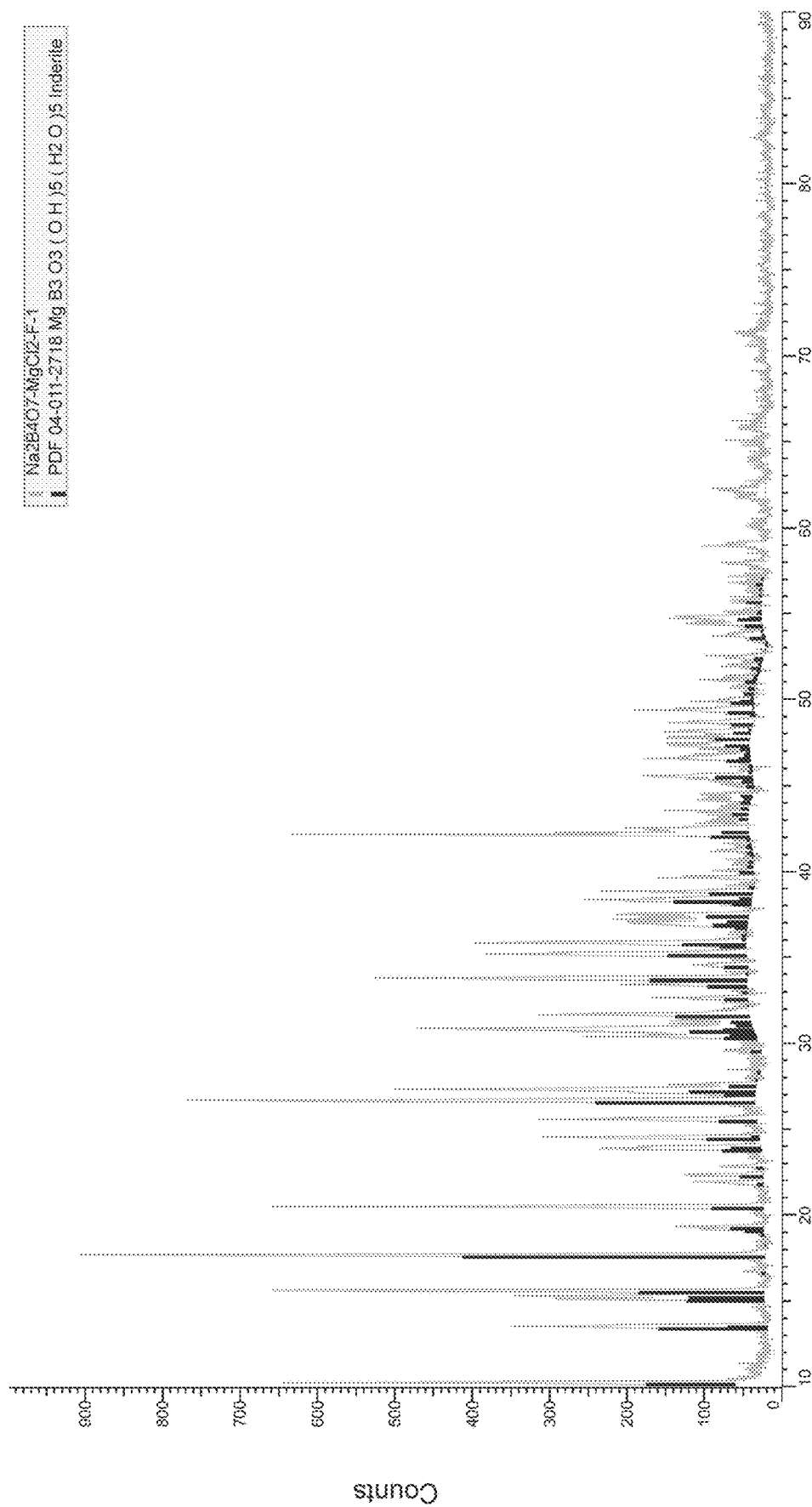
FIG. 19 shows a graph depicting the formation of inderite ($MgB_3O_3(OH)55H_2O$) in 2.0 m $MgCl_2+0.5$ m NaCl with 10.0080 grams of borax (Na2B4O7.10H2O) solid at 22.5° C.

Referring next to FIG. 19, the formation of inderite ($MgB_3O_3(OH)_5.5H_2O$) in 2.0 m $MgCl_2$+0.5 m NaCl with 10.0080 grams of borax ($Na_2B_4O_7.10H_2O$) solid at 22.5° C. is shown.

Figure 20:
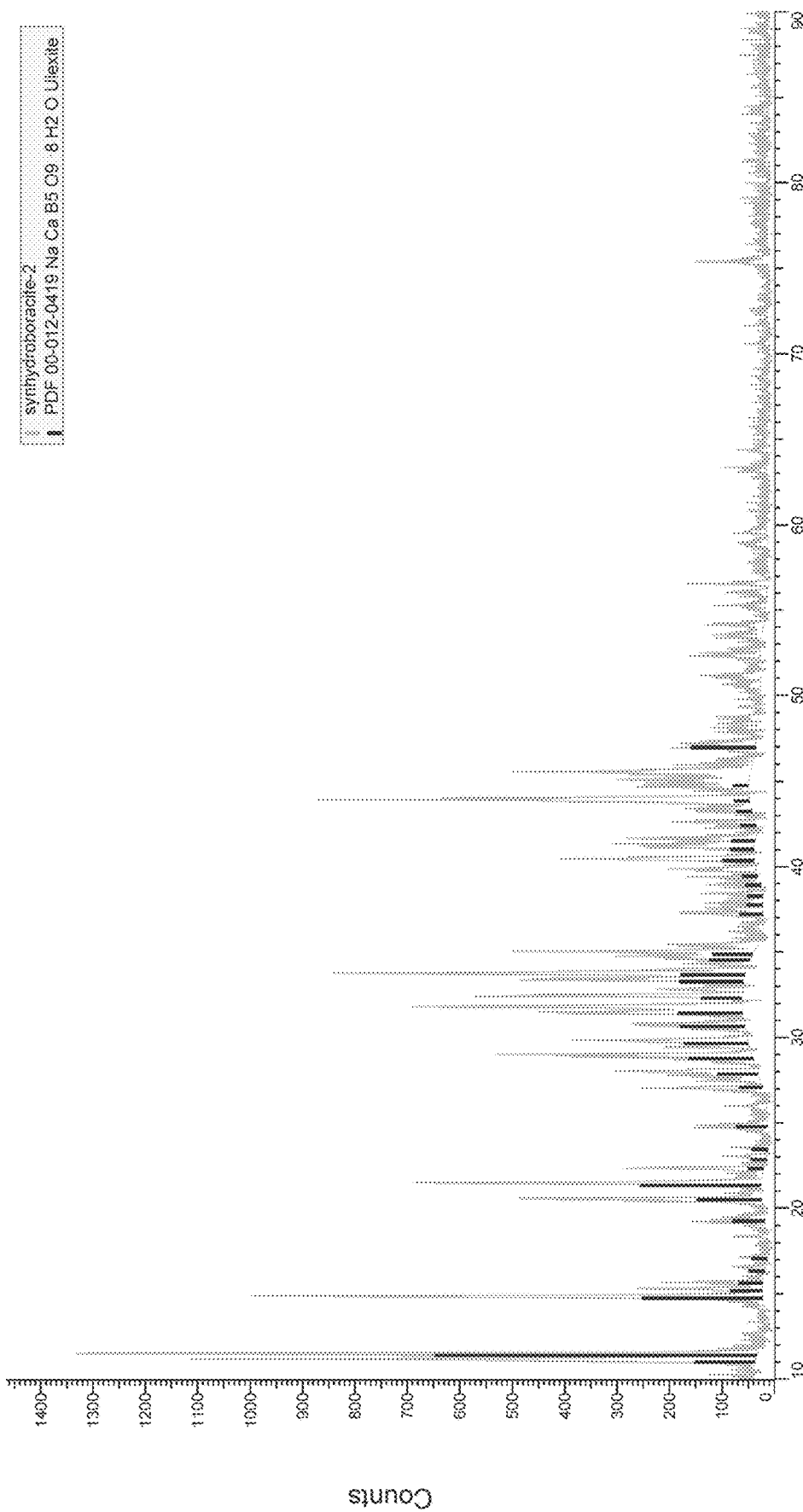
FIG. 20 shows a graph depicting the formation of ulexite ($NaCaB_5O_9 \cdot 8H_2O$) in the mixture of 250 mL of 0.1 M NaCl solution with 2.5 mL of 1.0 M $MgCl_2$ solution, with addition of 0.76699 grams of $H_3BO$ along with 0.3675 grams of $CaCl_2$).

Referring next to FIG. 20, the formation of ulexite ($NaCaB_5O_9.8H_2O$) in the mixture of 250 mL of 0.1 M NaCl solution with 2.5 mL of 1.0 M $MgCl_2$ solution, with addition of 0.76699 grams of $H_3BO_3$ along with 0.3675 grams of $CaCl_2$) is shown. After the solids are dissolved, NaOH with a concentration of 2.011 M is added in a dropwise fashion to increase pH in the solution for precipitation of ulexite. In geological repositories, the increase in pH can be achieved by the presence of engineered barriers such as industrial grade MgO and/or the presence of cementitious materials such as $CaO/Ca(OH)_2$.

The exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps can be varied or re-sequenced according to alternative embodiments.

It is important to note that the construction and arrangement of the desalinization membranes as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed can be constructed of multiple parts or elements, the position of elements can be reversed or otherwise varied, and the nature or number of discrete elements or positions can be altered or varied. Accordingly, all such modifications are intended to be included within the scope of the present application. The order or sequence of any process or method steps can be varied or re-sequenced according to alternative embodiments. In the claims, any means-plus-function clause is intended to cover the structures described herein as performing the recited function and not only structural equivalents but also equivalent structures. Other substitutions, modifications, changes and omissions can be made in the design, operating conditions and arrangement of the exemplary embodiments without departing from the scope of the present application.

The invention claimed is:

1. A repository for storing radioactive material adjacent to water, the repository comprising:
   a container for holding the radioactive material; and
   a sub-criticality controller for protecting the radioactive material from reaching a criticality from contact with the water;
   wherein the sub-criticality controller includes a metallic composition having a metal component and a borate component bonded to the metal component; and wherein the metallic composition forms a second borate from the borate component reacting with the metal component when the metallic composition contacts the water.

2. The repository of claim 1, wherein the second borate is selected from the group consisting of lead borate, cadmium borate, zinc borate, manganese borate, iron borate, cobalt borate, nickel borate, copper borate, tin borate, bismuth borate, antimony borate, calcium borate, magnesium borate, lead metaborate hydrate, cadmium metaborate, zinc metaborate, manganese metaborate, iron metaborate, cobalt metaborate, nickel metaborate, copper metaborate, tin metaborate, bismuth metaborate, and antimony metaborate.

3. The repository of claim 1, wherein
the borate component includes sodium tetraborate hydrate; and
the metal component includes a metal-bearing compound.

4. The repository of claim 3, wherein the metal-bearing compound is selected from the group consisting of a lead-bearing compound, a cadmium-bearing compound, a zinc-bearing compound, a manganese-bearing compound, an iron-bearing compound, a cobalt-bearing compound, a nickel-bearing compound, a copper-bearing compound, a tin-bearing compound, an antimony-bearing compound, a bismuth-bearing compound, a calcium-bearing compound, and a magnesium-bearing compound.

5. The repository of claim 1, wherein the metal component includes a metal oxide comprising a metal, and the borate component comprises boric acid.

6. The repository of claim 5, wherein the metal is selected from the group consisting of lead, cadmium, zinc, manganese, iron, cobalt, nickel, copper, tin, antimony, bismuth, calcium, and magnesium.

7. The repository of claim 1, wherein the metal component includes a metal hydroxide for providing a metal, and the borate material include boric acid.

8. The repository of claim 7, wherein the metal is selected from the group consisting of lead, cadmium, zinc, manganese, iron, cobalt, nickel, copper, tin, antimony, bismuth, calcium, and magnesium.

9. The repository of claim 1, wherein the metal component includes a cation selected from the group consisting of a divalent cation, a trivalent cation, a mixture of divalent cations, a mixture of trivalent cations, and a mixture of both divalent and trivalent cations.

10. The repository of claim 1, wherein the sub-criticality controller is in the container.

* * * * *